UNITED STATES PATENT OFFICE.

ISIDOR POLLAK, OF VIENNA, AUSTRIA-HUNGARY.

DIASTASE PREPARATIONS AND METHOD OF MAKING SAME.

1,153,640. Specification of Letters Patent. Patented Sept. 14, 1915.

No Drawing. Application filed May 11, 1914. Serial No. 837,866.

*To all whom it may concern:*

Be it known that I, ISIDOR POLLAK, a subject of the Emperor of Austria-Hungary, and residing at Vienna, Austria-Hungary, have invented certain new and useful Improvements in Diastase Preparations and Methods of Making Same, of which the following is a specification.

The concentrated or solid diastase preparations obtainable commercially have, as is well known, the essential disadvantage of being of comparatively small efficiency, since any treatment in the hot reduces the proportion of active ferments, particularly of amylase. If diastase preparations are manufactured without an evaporating operation, they must be diluted with drying agents or with large quantities of maltose. Finally, if the diastase were left, without any additions of this sort, in a non-evaporated solution, its diastatic activity would be greatly affected, even if left to stand for a short time, owing to the action of microorganisms, especially of lactic acid and butyric acid bacteria. The surprising observation has been made that, by adding reducing agents to diastase solutions, the diastatic efficiency is not only preserved, but is even considerably increased. In the presence of such agents there takes place an accretion of diastase, which in certain conditions may attain a multiple of the original diastase power. Apart from their proper reducing action certain reducing agents act at the same time as poisons to bacteria so that their use stops the multiplying of lactic acid and butyric acid bacteria and at the same time avoids the injury to the diastase, which would be caused by the acids produced by these bacteria. But the proof that the influence of strong reducing agents does not consist only in this preserving action, is supplied by the fact that at an ordinary temperature, the addition of a reducing agent does not increase the activity, or increases it only to a very slight extent, whereas upon heating a considerable increase in diastatic power is obtained. The first conclusion to be drawn from this latter observation is that concentration of diastase solution should be carried out in the presence of reducing substances. The addition of a strong reducing agent almost entirely avoids losses of diastatic capacity which diastase solutions otherwise suffer on being evaporated in a vacuum. The reducing agent can be however added also to the water used for the extraction of diastase, but care must then be taken that it is not consumed during the extraction process, but is still present in sufficient quantity during the evaporation of the solution. Even in the case of preparations which have lost diastatic activity owing to a hot treatment, the diastatic efficiency can be considerably increased by the action of reducing agents. From this results a method of carrying out the process of the invention, which consists in adding small quantities of strong reducing agents to the concentrated diastase preparations.

The process according to the invention is carried out for instance by using, for the purpose of extracting diastase, water to which are added small quantities of a strongly reducing agent, for example 0.1–0.3% of a thiosulfate, the sodium salt ($Na_2S_2O_3$) being suitable. The extract prepared in this manner, is concentrated *in vacuo* in the usual way. The reducing agent can also be added to the finished extract before the evaporation. It is by no means necessary to carry out the extraction or concentration at specially low temperatures. The action of the reducing substance is much better at higher temperatures, such as for instance 40°–50° C. than in the cold. Instead of evaporating in the presence of the reducing agent, the latter can be lastly added to the concentrated preparation. But also in this case, it is necessary to take care for the reason mentioned above, that the action takes place at a temperature of over 40° C. The longer the product is left to stand, the more favorable the results, but a treatment of 5–6 hours gives very good results.

It has been already suggested to use reducing salts for the purpose of improving the mashing and fermenting process in breweries and distilleries. Thus, for instance, in German Patent No. 143073 there is proposed an addition of iron salts to the mashing water, in order to obtain a more quickly fermenting and also thinner mash, which gives a higher yield of alcohol; according to German Patent No. 152136, the addition of thiosulfuric acid salts to the mashing water or to the mash itself, makes the mash thinner, causes it to ferment more quickly and, owing to the better decomposition of the mashing material, gives a higher yield of alcohol and yeast. For brewing beer, sulfur dioxid, sulfites and bisulfites have also been recommended as additions to the mashing process. In the mashing process in which the diastase has merely to bring about the saccharification immediately following the preparation of the mash, the reducing substances cannot possibly exercise the action on which the present process is based. The possibility of manufacturing diastase preparations of extraordinarily greater efficiency, by utilizing reducing additions, was therefore by no means obvious from the above suggestions. As a matter of fact, the industry is still unacquainted with this valuable possibility, although for instance formaldehyde has been recommended as an excellent means for keeping clean the fermentation in the alcohol manufacture, as this bacterium poison exercises a preserving and stimulating action on the diastase enzyms of the malt. It has also been previously suggested, for the purpose of manufacturing malt extracts (see British Patent No. 7989/09, to treat green malt, before the preparation and saccharification of the extract, with sulfur dioxid. But the said process starts from the entirely erroneous idea that sulfur dioxid acts favorably only in the first stage of the process, while subsequently it would have injurious consequence, and therefore considers it essential to dose the sulfur dioxid so that it should not be able to affect the extract unfavorably during the subsequent stages of the treatment. With that object in view the quantity of sulfur dioxid is calculated so that it is completely consumed during the reaction on the green malt pulp in the hot, and the excess of sulfur dioxid, even if exceedingly small, has to be carefully neutralized before saccharification. The sulfur dioxid is used here chiefly for skinless or husk free grain as an antigermic conserving and digestive agent which has fulfilled its object before the mash is brought to the saccharification temperature, and must then be no longer present.

Unlike the above, it is immaterial for the process according to the present invention, at which stage of the process the reducing agents are added. It is however essential that they should still be present during the concentration of the solutions or in the finished preparations, and should have an opportunity to act on the diastase solutions.

I am aware that certain sugars which are always present in malt extracts are reducing agents, since they will reduce alkaline copper solutions, and precipitate cuprous oxid, but I call attention to the fact that I do not claim reducing sugars as the reducing agents present in the malt extracts, or added thereto for the purpose of increasing the diastatic activity.

I claim:

1. In the process of making diastase preparations by leaching malt and concentrating the extract, the improvement which comprises increasing the diastatic activity of said extract by adding a reducing agent thereto.

2. In the manufacture of diastase preparations the step of extracting malt with a solvent containing a small amount of a strong reducing agent, and thereafter concentrating the extract in presence of said added reducing agent.

3. In the manufacture of diastase preparations, the step of concentrating the diastase solution in the presence of a relatively small amount of a strong reducing agent.

4. In the manufacture of diastase preparations, the step of concentrating the diastase solution in the presence of a relatively small amount of a thiosulfate.

5. The process of making diastase preparations, which comprises extracting malt with water containing a small amount of a thiosulfate, and concentrating the extract.

6. In the manufacture of diastase preparations, the step of adding a strong reducing agent to the concentrated extract and maintaining the preparation for at least 5 to 6 hours, at a temperature of over 40°.

7. In the preparation of diastase preparations of high diastatic power, the step of adding a small amount of a strong reducing agent to the diastase solution and preventing the accumulation therein of any material amount of lactic acid bacteria, whereby the diastatic activity of the solution will increase.

8. A diastase preparation of relatively high diastatic power, which contains a relatively strong reducing agent.

9. A diastase preparation of relatively high diastatic power, which contains a thiosulfate.

ISIDOR POLLAK.

Witnesses:
   Joseph C. Stadley,
   August Fugger.